(12) United States Patent
Kovega et al.

(10) Patent No.: US 11,075,867 B2
(45) Date of Patent: Jul. 27, 2021

(54) METHOD AND SYSTEM FOR DETECTION OF POTENTIAL SPAM ACTIVITY DURING ACCOUNT REGISTRATION

(71) Applicant: YANDEX EUROPE AG, Lucerne (CH)

(72) Inventors: Dmitriy Nikolaevich Kovega, Mytishchi (RU); Ekaterina Aleksandrovna Kovega, Mytishchi (RU)

(73) Assignee: YANDEX EUROPE AG, Lucerne (CH)

( * ) Notice: Subject to any disclaimer, the term of this patent is extended or adjusted under 35 U.S.C. 154(b) by 555 days.

(21) Appl. No.: 15/893,824

(22) Filed: Feb. 12, 2018

(65) Prior Publication Data
US 2019/0036858 A1    Jan. 31, 2019

(30) Foreign Application Priority Data

Jul. 26, 2017   (RU) ................................ 2017126673

(51) Int. Cl.
*H04L 12/58* (2006.01)
*G06F 16/955* (2019.01)
(Continued)

(52) U.S. Cl.
CPC .......... *H04L 51/12* (2013.01); *G06F 16/9566* (2019.01); *G06N 5/047* (2013.01);
(Continued)

(58) Field of Classification Search
CPC ....... H04L 51/12; H04L 67/02; H04L 67/146; H04L 67/306; G06F 16/9566; G06N 20/00; G06N 5/047
See application file for complete search history.

(56) References Cited

U.S. PATENT DOCUMENTS 8,601,547 B1 * 12/2013 Shen .................... G06F 21/6209
    726/4
9,361,446 B1 *  6/2016 Demirjian ............... H04L 63/14
(Continued)

OTHER PUBLICATIONS

Kater et al., "You Shall Not Pass: Detecting Malicious Users at Registration Time", ACM ISBN 978-1-4503-4364-0/16/05, 2016, 6 pages.

*Primary Examiner* — Hitesh Patel
*Assistant Examiner* — Sujana Khakural
(74) *Attorney, Agent, or Firm* — BCF LLP

(57) ABSTRACT

A computer implemented method for detecting an preventing spam account generation is disclosed. The method comprises receiving, by the email server, a request from the browser application to create an email account for at least one of sending and receiving an electronic message over the communication network, the request comprising at least the unique browser ID, acquiring, a browsing history data associated with the unique browser ID, the browsing history data being indicative of the browser application's browsing history with the at least one web resource; analyzing the browsing history data to determine a user score of the request, the user score being indicative of a likelihood that the user is one of a human or a bot executed by a computer application; and upon determining that the user score is indicative of a higher likelihood that the user is the bot, performing a restrictive action to the request.

12 Claims, 6 Drawing Sheets

(51) Int. Cl.
*G06N 20/00* (2019.01)
*H04L 29/08* (2006.01)
*G06Q 10/10* (2012.01)
*G06N 5/04* (2006.01)

(52) U.S. Cl.
CPC ............ *G06N 20/00* (2019.01); *H04L 67/02* (2013.01); *H04L 67/146* (2013.01); *H04L 67/306* (2013.01)

(56) References Cited

U.S. PATENT DOCUMENTS

| | | | |
|---|---|---|---|
| 10,438,225 B1* | 10/2019 | Reading | G06Q 30/0225 |
| 2006/0277259 A1 | 12/2006 | Murphy et al. | |
| 2008/0140781 A1 | 6/2008 | Bocharov et al. | |
| 2010/0076922 A1 | 3/2010 | Hariharan et al. | |
| 2010/0082357 A1 | 4/2010 | Follmann et al. | |
| 2010/0281539 A1* | 11/2010 | Burns | H04L 63/1441 |
| | | | 726/23 |
| 2010/0318614 A1 | 12/2010 | Sager et al. | |
| 2013/0073509 A1* | 3/2013 | Burkard | G06F 16/951 |
| | | | 706/52 |
| 2013/0226908 A1 | 8/2013 | Risher et al. | |
| 2013/0246609 A1* | 9/2013 | Topchy | G06F 16/957 |
| | | | 709/224 |
| 2014/0244386 A1* | 8/2014 | Mathur | G06Q 30/0255 |
| | | | 705/14.53 |
| 2016/0099961 A1* | 4/2016 | Paugh | G06F 16/90335 |
| | | | 726/23 |
| 2016/0191554 A1* | 6/2016 | Kaminsky | G06F 21/31 |
| | | | 726/23 |
| 2017/0085583 A1* | 3/2017 | Torres | H04L 63/1408 |

\* cited by examiner

| No. | Set of URLs 304 | Access time 306 |
|---|---|---|
| 1. | www.aaaa.com | 2017-05-19 8:23:56 |
| 2. | www.bbb.com | 2017-05-19 8:25:01 |
| 3. | www.ccc.com | 2017-05-19 8:28:45 |
| 4. | www.ddd.com | 2017-05-19 8:30:27 |
| 5. | www.eee.com | 2017-05-19 12:59:37 |
| 6. | www.fff.com | 2017-05-19 13:01:55 |
| 7. | www.ggg.com | 2017-05-19 14:30:02 |
| 8. | www.hhh.com | 2017-05-19 19:01:15 |
| 9. | www.iii.com | 2017-05-19 19:01:55 |
| 10. | www.jjj.com | 2017-05-19 19:03:45 |
| 11. | www.kkk.com | 2017-05-19 19:05:25 |
| 12. | www.lll.com | 2017-05-20 6:23:45 |
| 13. | www.mmm.com | 2017-05-20 6:28:21 |
| 14. | www.nnn.com | 2017-05-20 6:28:45 |
| 15. | www.mail.yandex.ru | 2017-05-20 6:32:26 |

Unique browser ID 134

| First navigational Session 502 | | |
|---|---|---|
| 1. | www.aaaa.com 504 | 2017-05-19 8:23:56 |
| 2. | www.bbb.com 506 | 2017-05-19 8:25:01 |
| 3. | www.ccc.com 508 | 2017-05-19 8:28:45 |
| 4. | www.ddd.com 510 | 2017-05-19 8:30:27 |

| Second navigational session 512 | | |
|---|---|---|
| 5. | www.eee.com | 2017-05-19 12:59:37 |
| 6. | www.fff.com | 2017-05-19 13:01:55 |

| Third navigational session 514 | | |
|---|---|---|
| 7. | www.ggg.com | 2017-05-19 14:30:02 |

| Fourth navigational session 516 | | |
|---|---|---|
| 8. | www.hhh.com | 2017-05-19 19:01:15 |
| 9. | www.iii.com | 2017-05-19 19:01:55 |
| 10. | www.jjj.com | 2017-05-19 19:03:45 |
| 11. | www.kkk.com | 2017-05-19 19:05:25 |

| Fifth navigational session 518 | | |
|---|---|---|
| 12. | www.lll.com | 2017-05-20 6:23:45 |
| 13. | www.mmm.com | 2017-05-20 6:28:21 |
| 14. | www.nnn.com | 2017-05-20 6:28:45 |

FIG. 5

METHOD AND SYSTEM FOR DETECTION OF POTENTIAL SPAM ACTIVITY DURING ACCOUNT REGISTRATION

CROSS-REFERENCE

The present application claims priority to Russian Patent Application No. 2017126673, entitled "Method And System For Detection Potential Spam Activity During Account Registration", filed Jul. 26, 2017, the entirety of which is incorporated herein by reference.

FIELD

The present technology generally relates to systems and methods for creation of new email accounts in an e-mail service, and, in particular, to methods and systems for detecting and preventing spam account registration.

BACKGROUND

Electronic mail messages, usually shortened as "email" or "e-mail", have become a very common means of communication. With the growing access to the internet, the user has the ability to set up email accounts with an e-mail service and thereafter to access the e-mail account using a user electronic device to send and receive email messages, thereby replacing the standard post letter, the telephone, and the facsimile as the preferred means of communication.

The relative easiness to obtain an email account (often with no cost to the user) has also increased the number of spam messages being sent by malicious individuals and organizations. Spam messages, also known as junk email, is the indiscriminate sending of unsolicited email messages by email.

Many of the spam messages are commercial in nature, but may also contain links to web resources that, at least on a first appearance, may look like familiar web resources to the user (such as a web banking page of a bank or the like) which in fact lead to phishing web resources or to web resources that host malware.

In addition to being annoying and dangerous to the electronic device of the recipient, spam messages place considerable burden on email providers (such as Yandex™ Mail, Yahoo!™ Mail and the like) and the communication network. Indeed, spam messages account for a major portion of the daily internet email traffic and the email providers must constantly come up with spam filtering solutions to maintain user satisfaction, as well as integrity and workability of the network.

Generally speaking, there exist several computer-based approaches at reducing the number of spam messages to be received by a given recipient in the e-mail distribution system/service. For example, a simple approach adopted by email providers is to filter spam messages by looking at certain keywords (such as "Free drugs", "Cialis™", and the like). However, this filtering approach can easily be circumvented by the sender of spam messages by replacing the letters of the filtered keyword by letters that appear to be similar but are computationally distinct (such as replacing the roman letter "K" with the Cyrillic letter "К").

Another approach to reducing the number of spam messages consist in refusing the request of a new account by the email providers at the registration stage by determining the likelihood of the new account to be used for spamming purposes.

US 2010/0076922 provides at least three processes for detecting the probability of abusive use of a message account for sending large amounts of unsolicited messages, such as spam, to other message accounts. For example, information provided at registration for a new message account can be processed to determine the likelihood of abusive use of that message account. Also, inbound messages can be processed to determine if the message account that sent the inbound message is abusing the use of that message account. Additionally, outbound messages can be processed to determine if the message account that is attempting to send an outbound message is abusing the use of that message account. Each of these three processes can operate separately or in any combination with each other to further improve the probability that abusive use of a message account will be detected promptly and accurately.

U.S. Pat. No. 8,601,547 B1 provides a computer implemented method for detecting and preventing spam account generation. Upon receiving an account creation request from a client, the server analyzes the request and associates a spam score with the account creation request, based at least in part on a number of new account requests associated with the cookie received during a predefined time period, and compares the spam score with certain predefined thresholds. If the spam score is above a first threshold, the server may refuse the account creation request. If the spam score is within a certain range, the server may limit the access to the account associated with the account creation request. If the spam score is below a second threshold, the server may put no limit on access to (i.e., enable normal use of) the account.

The article entitled "You Shall Not Pass: Detecting Malicious Users at Registration Time", by Kater C., and Jaschke R., discloses a method of identifying users to be spammers by assessing information provided during the registration process.

SUMMARY

It is an object of the present technology to provide improved method and system for decreasing the number of spam messages being sent over the communication network by preventing registration of email accounts that are likely to be used for such purposes. As such, it will be apparent to those skilled in the art that the present technology aims at improving the "quality" of the network traffic (by reducing the number of spam messages being sent over the network) and consequently decreasing the computational burden on the servers associated with email services.

Developer's have developed embodiments of the present technology based on their appreciation of at least one problem associated with the prior art. For example, even though the prior art solutions have merits and assist in reducing the number of email accounts created for the purpose of sending spam messages, it still presents certain shortcomings. For example, due to the limited amount of information transmitted by the browser application with the registration request, it is difficult to achieve a certainty in determining whether a particular e-mail account is created for legitimate purpose or that the email account is created for the purpose of sending spam messages.

In developing the present technology, developers noted that a growing number of web resources being accessible by the browser application are serviced by web analytic services (such as Google Analytics™, and Yandex Metrica™, and the like). Briefly speaking, these web analytic services are configured to collect and store data associated with the browser application.

Without wishing to be bound to any specific theory, embodiments of the present technology have been developed based on an assumption that by assessing the browsing/navigational history of the browser application originating a request to create the email account, an increased certainty, or confidence, that the email account will be used for the purpose of spamming could be obtained.

According to a broad aspect of the present technology, there is provided a computer implemented method. The method is executable by an email server to a client device associated with a user, via a communication network. The client device comprises a permanent storage, a browser application having previously accessed, via the communication network, at least one web resource; and a unique browser ID associated with the browser application and stored within the permanent storage. The method comprises: receiving, by the email server, a request from the browser application to create an email account for at least one of sending and receiving an electronic message over the communication network, the request comprising at least the unique browser ID; acquiring, a browsing history data associated with the unique browser ID, the browsing history data being indicative of the browser application's browsing history with the at least one web resource; analyzing the browsing history data to determine a user score of the request, the user score being indicative of a likelihood that the user is one of a human or a bot executed by a computer application; upon determining that the user score is indicative of a higher likelihood that the user is the bot, performing a restrictive action to the request.

In some embodiments of the method, acquiring the browsing history data comprises retrieving the browsing history data from a web analytic application servicing the at least one web resource.

In some embodiments of the method, browsing history data comprises: an access time for each of the at least one web resources by the browser application; and one or more uniform resource locators (URLs) sorted chronologically based on its respective access time, each of the one or more URLs corresponding to a respective one of the at least one web resources In some embodiments of the method, determining the user score comprises parsing the chronologically sorted one or more URLs into one or more navigational sessions, the one or more navigational session comprising at least one of the one or more URLs accessed by the browser application during a period of time starting with a connection to the communication network by the browser application and terminating with a disconnection from the communication network by the browser application.

In some embodiments of the method, the email server is further configured to execute a machine learning algorithm (MLA), the MLA having been previously trained on a sample that is marked as human like navigational pattern, and configured to determine if a set of predetermined features of a given navigational session is indicative of one of a low likelihood of the user being the bot, or a high likelihood of the user being the bot; and determining the user score further comprises: retrieving the set of predetermined features for each of the one or more navigational sessions, the set of predetermined features comprising at least one of: a duration of a given navigational session; a number of recurrence of URLs having a same host name in the given navigational session; a presence of a URL associated with a search engine service in the given navigational session; a number of URLs contained within the given navigational session; and assigning, for each of the one or more navigational sessions, one of (i) a logical pattern score value representing the low likelihood of the user being a bot, or (ii) a non-logical pattern score value representing the high likelihood of the user being a bot, wherein assigning the logical pattern score value comprises: inputting the retrieved set of features to the MLA; assigning the logical pattern score value upon determining that the retrieved set of features are indicative of the low likelihood of the user being the bot; assigning the non-logical pattern score value comprises: inputting the retrieved set of features to the MLA; assigning the non-logical pattern score value upon determining that the retrieved set of features are indicative of the high likelihood of the user being the bot; obtaining the user score by aggregating the logical pattern score value and the non-logical pattern score value of the one or more navigational sessions and further dividing by a total number of navigational sessions included in the browsing history data.

In some embodiments of the method, determining that the user score is indicative of a higher likelihood that the user is the bot comprises determining the obtained user score to be above an empirically determined confidence threshold indicative of a confidence that the user is the bot.

In some embodiments of the method, upon determining that the user score is below the confidence threshold, the method further comprises: determining a potential human spammer score value, the potential human spammer score value being indicative of a likelihood that the user is a potential spammer or not; and performing the restrictive action to the request upon determining that the potential human spammer score value is indicative of a higher likelihood that the user is a potential spammer.

In some embodiments of the method, determining the potential human spammer score value comprises: determining a ratio of (i) URLs in the browsing history data found within a list of URLs of one or more web resources empirically determined to be associated with spamming activities, to (ii) a total number of URLs in the web browsing history data; and wherein assigning the potential human spammer score value based on the ratio, wherein a higher ratio is indicative of the higher likelihood that the user is a potential spammer.

In some embodiments of the method, determining the potential human spammer score value comprises: determining a number of URLs contained within the browsing history data; and assigning the potential human spammer score based on the number of URLs contained within the browsing history data, wherein: a higher number of URLs above a first predetermined number is indicative of the higher likelihood that the user is a potential spammer; and a lower number of URLs below a second predetermined number is indicative of the higher likelihood that the user is a potential spammer.

In some embodiments of the method, the list of URLs is maintained by the email server.

In some embodiments of the method, the restrictive action comprises refusing the request to create the email account.

According to another broad aspect of the present technology, there is provided a server. The server is coupled to a client device associated with a user via a communication network, the client device comprising a permanent storage, a browser application having previously accessed, via the communication network, at least one web resource, and a unique browser ID associated with the browser application and stored within the permanent storage. The server comprises a network interface for communicatively coupling to the communication network; a processor coupled to the network interface, the processor configured to: receive, by the server, a request from the browser application to create an email account for at least one of sending and receiving an electronic message over the communication network, the request comprising at least the unique browser ID; acquire, a browsing history data associated with the unique browser ID, the browsing history data being indicative of the browser application's browsing history with the at least one web resource; analyze the browsing history data to determine a user score of the request, the user score being indicative of a likelihood that the user is one of a human or a bot executed by a computer application; upon determining that the user score is indicative of a higher likelihood that the user is the bot, perform a restrictive action to the request.

In some embodiments of the server, to acquire the browsing history data, the processor is configured to retrieve the browsing history data from a web analytic application servicing the at least one web resource.

In some embodiments of the server, the browsing history data comprises: an access time for each of the at least one web resources by the browser application; and one or more uniform resource locators (URLs) sorted chronologically based on its respective access time, each of the one or more URLs corresponding to a respective one of the at least one web resources.

In some embodiments of the server, to determine the user score, the processor is configured to parse the chronologically sorted one or more URLs into one or more navigational sessions, the one or more navigational session comprising at least one of the one or more URLs accessed by the browser application during a period of time starting with a connection to the communication network by the browser application and terminating with a disconnection from the communication network by the browser application.

In some embodiments of the server, the processor is further configured to execute a machine learning algorithm (MLA), the MLA having been previously trained on a sample that is marked as human like navigational pattern, and configured to determine if a set of predetermined features of a given navigational session is indicative of one of a low likelihood of the user being the bot, or a high likelihood of the user being the bot; and to determine the user score, the processor is configured to: receive the set of predetermined features for each of the one or more navigational sessions, the set of predetermined features comprising at least one of: a duration of a given navigational session; a number of recurrence of URLs having a same host name in the given navigational session; a presence of a URL associated with a search engine service in the given navigational session; a number of URLs contained within the given navigational session; and assign, for each of the one or more navigational sessions, one of (i) a logical pattern score value representing the low likelihood of the user being a bot, or (ii) a non-logical pattern score value representing the high likelihood of the user being a bot, wherein assigning the logical pattern score value comprises: inputting the retrieved set of features to the MLA; assigning the logical pattern score value upon determining that the retrieved set of features are indicative of the low likelihood of the user being the bot; assigning the non-logical pattern score value comprises: inputting the retrieved set of features to the MLA; assigning the non-logical pattern score value upon determining that the retrieved set of features are indicative of the high likelihood of the user being the bot; obtain the user score by aggregating the logical pattern score value and the non-logical pattern score value of the one or more navigational sessions and further dividing by a total number of navigational sessions included in the browsing history data.

In some embodiments of the server, to determine that the user score is indicative of a higher likelihood that the user is the bot, the processor is configured to determine the obtained user score to be above an empirically determined confidence threshold indicative of a confidence that the user is the bot.

In some embodiments of the server, upon determining that the user score is below the confidence threshold, the processor is further configured to: determine a potential human spammer score value, the potential human spammer score value being indicative of a likelihood that the user is a potential spammer or not; and perform the restrictive action to the request upon determining that the potential human spammer score value is indicative of a higher likelihood that the user is a potential spammer.

In some embodiments of the server, to determine the potential human spammer score value, the processor is configured to: determine a ratio of (i) URLs in the browsing history data found within a list of URLs of one or more web resources empirically determined to be associated with spamming activities, to (ii) a total number of URLs in the web browsing history data; and assign the potential human spammer score value based on the ratio, wherein a higher ratio is indicative of the higher likelihood that the user is a potential spammer.

In some embodiments of the server, to determine the potential human spammer score value, the processor is configured to: determine a number of URLs contained within the browsing history data; and assign the potential human spammer score based on the number of URLs contained within the browsing history data, wherein: a higher number of URLs above a first predetermined number is indicative of the higher likelihood that the user is a potential spammer; and a lower number of URLs below a second predetermined number is indicative of the higher likelihood that the user is a potential spammer.

In some embodiments of the server, the list of URLs is maintained by the server.

In some embodiments of the server, the restrictive action comprises refusing the request to create the email account by the processor.

In the context of the present specification, a "server" is a computer program that is running on appropriate hardware and is capable of receiving requests (e.g. from electronic devices) over the network, and carrying out those requests, or causing those requests to be carried out. The hardware may be one physical computer or one physical computer system, but neither is required to be the case with respect to the present technology. In the present context, the use of the expression a "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

In the context of the present specification, unless provided expressly otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

DESCRIPTION OF THE DRAWINGS

For a better understanding of the present technology, as well as other aspects and further features thereof, reference is made to the following description which is to be used in conjunction with the accompanying drawings, where:

FIG. 3 depicts a schematic illustration of a browsing history data stored within the tracking database of the system 100.

FIG. 5 depicts a schematic illustration of a parsed browsing history data by the account registration application of the system 100.

DETAILED DESCRIPTION

Figure 1:
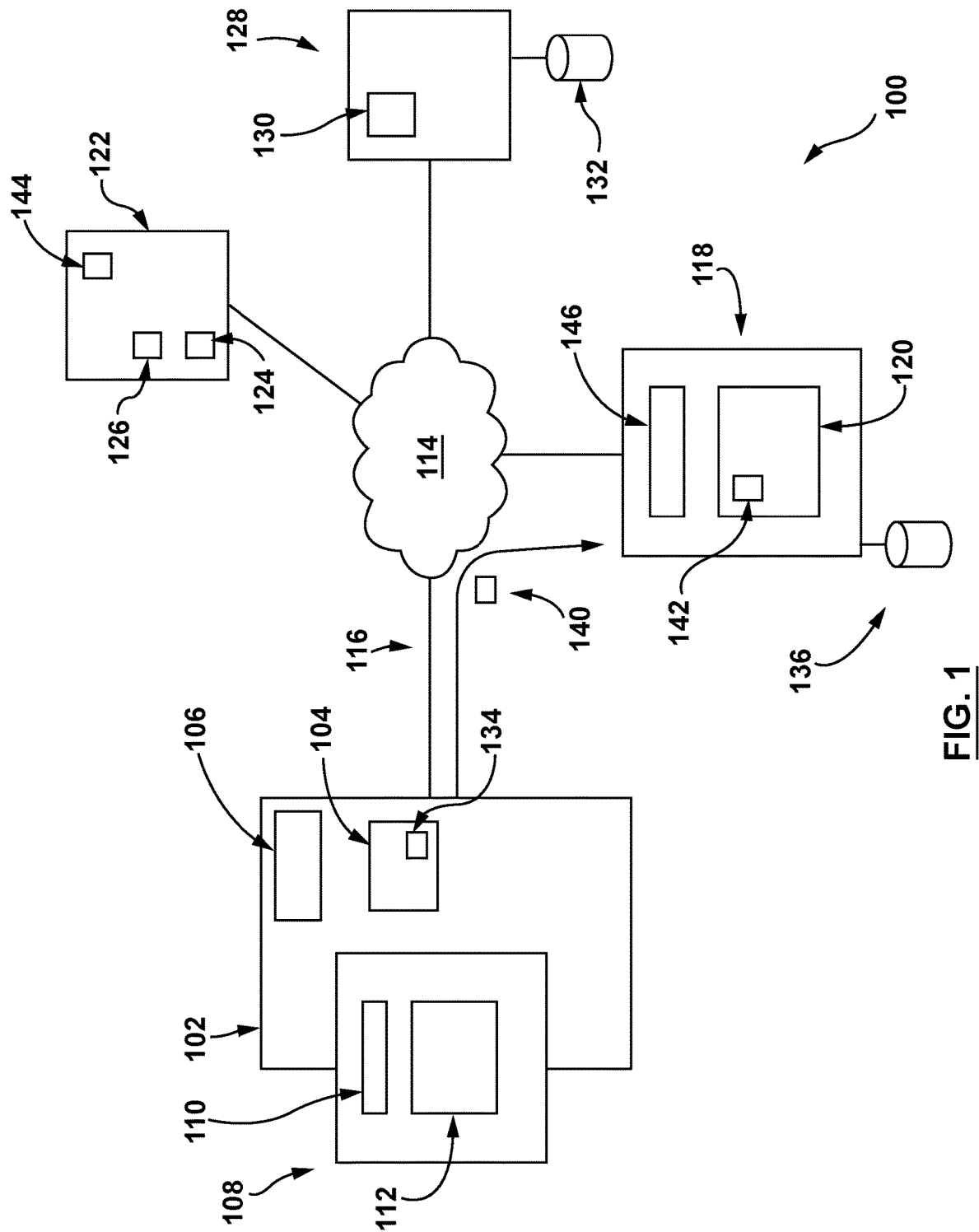
FIG. 1 is a schematic diagram depicting a system 100, the system 100 being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises an electronic device 102. The electronic device 102 is typically associated with a user (not depicted) and, as such, can sometimes be referred to as a "client device". It should be noted that the fact that the electronic device 102 is associated with the user does not mean to suggest or imply any mode of operation—such as a need to log in, a need to be registered or the like.

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art to execute a browser application 108. Generally speaking, the purpose of the browser application 108 is to enable the user (not depicted) to access one or more web resources. The manner in which the browser application 108 is implemented is known in the art and will not be described herein. Suffice to say that the browser application 108 may be one of Google™ Chrome™, Yandex. Browser™, or other commercial or proprietary browsers.

Irrespective of how the browser application 108 is implemented, the browser application 108, typically, has a command interface 110 and a browsing interface 112. Generally speaking, the user (not depicted) can access a web resource via a communication network by two principle means. The given user can access a particular web resource directly, either by typing an address of the web resource (typically an URL or Universal Resource Locator, such as www.example.com) into the command interface 110 or by clicking a link in an e-mail or in another web resource (which action will in a sense "copy and paste" the URL associated with the link into the command interface 110).

Alternatively, the given user may conduct a search using a search engine service (not depicted) to locate a resource of interest based on the user's search intent. The latter is particularly suitable in those circumstances, where the given user knows a topic of interest, but does not know the URL of the web resource she is interested in. The search engine typically returns a Search Engine Result Page (SERP) containing links to one or more web resources that are responsive to the user query. Again, upon the user clicking one or more links provided within the SERP, the user can open the required web resource.

The electronic device 102 comprises a communication interface (not depicted) for two-way communication with a communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like.

How the communication link 116 is implemented is not particularly limited and depends on how the electronic device 102 is implemented. Merely as an example and not as a limitation, in those embodiments of the present technology where the electronic device 102 is implemented as a wireless communication device (such as a smart phone), the communication link 116 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116 and the communication network 114. As such, by no means the examples provided hereinabove are meant to limit the scope of the present technology.

The system 100 further includes an email server 118 coupled to the communication network 114. The email server 118 can be implemented as a conventional computer server. In an example of an embodiment of the present technology, the email server 118 can be implemented as a Dell PowerEdge™ Server running the Microsoft Windows Server™ operating system. Needless to say, the email server 118 can be implemented in any other suitable hardware and/or software and/or firmware or a combination thereof. In the depicted non-limiting embodiment of the present technology, the email server 118 is a single server. In alternative non-limiting embodiments of the present technology, the functionality of the email server 118 may be distributed and may be implemented via multiple servers.

The implementation of the email server 118 is well known. However, briefly speaking, the email server 118 comprises a communication interface (not depicted) structured and configured to communicate with various entities (such as the electronic device 102 and other devices potentially coupled to the communication network 114) via the communication network 114. Similar to the electronic device 102, the email server 118 comprises an email server memory 120 which comprises one or more storage media and generally provides a place to store computer-executable program instructions executable by an email server processor 146. By way of example, the email server memory 120 may be implemented as tangible computer-readable storage medium including Read-Only Memory (ROM) and/or Random-Access Memory (RAM). The email server memory 120 may also include one or more fixed storage devices in the form of, by way of example, hard disk drives (HDDs), solid-state drives (SSDs), and flash-memory cards.

In some embodiments, the email server 118 can be operated by the same entity that has provided the aforedescribed browser application 108. For example, if the browser application 108 is a Yandex.Browser™, the email server 118 can be operated by Yandex LLC of Lev Tolstoy Street, No. 16, Moscow, 119021, Russia. In alternative embodiments, the email server 118 can be operated by an entity different from the one who has provided the aforementioned browser application 108.

In accordance with the present technology, the email server 118 provides an email service (not depicted) which is accessible by the electronic device 102 by typing the URL of a web portal or a web page that hosts the email service (such as mail.yandex.ru, or the like) into the command interface 110 of the browser application 108 (or clicking a hyperlink associated therewith).

The system 100 further includes a web server 122 coupled to the communication network 114. Suffice to say that the web server 122 can (but does not have to) be implemented in a similar manner to the email server 118. In the depicted embodiments of the present technology, the web server 122 is a single server. In alternative non-limiting embodiments of the present technology, the functionality of the web server 122 may be distributed and implemented via multiple servers.

In some embodiments of the present technology, and generally speaking, the web server 122 functions as a repository for a first web resource 124 and a second web resource 126. In the context of the present specification, the term "web resource" refers to any network resource (such as a web page, web site), which its content is presentable visually by the electronic device 102 to the user, via the browser application 108, and associated with a particular web address (such as a URL).

Each of the first web resource 124 and the second web resource 126 is accessible by the electronic device 102 via the communication network 114, for example, by means of the user typing in the URL in the browser application 108 or executing a web search using the search engine (not depicted). Although in the depicted non-limiting embodiment of the present technology, the web server 122 hosts only the first web resource 124 and the second web resource 126, it is not limited as such and, may host more or fewer than two web resources.

The system further includes a tracking server 128 coupled to the communication network 114. Suffice to say that the tracking server 128 can (but does not have to) be implemented in a similar manner to the email server 118. In the depicted embodiments of the present technology, the tracking server 128 is a single server. In alternative non-limiting embodiments of the present technology, the functionality of the tracking server 128 may be distributed and implemented via multiple servers.

In some embodiments of the present technology, the tracking server 128 hosts a web analytic application 130, such as, for example, Yandex.Metrica™ and Google Analytics™. The manner in which the web analytic application 130 is implemented is known, and therefore will not be described at length herein. Suffice to say that the web analytic application 130 is configured to track and store browsing history data (described below) of a given browser application. As such, the web analytic application 130 is in communication with a tracking database 132 (described below).

In some embodiments, the web analytic application 130 can be operated by the same entity that operates the aforedescribed email server 118. As such, the web analytic application 130 (and/or the tracking database 132) needs not to be implemented within the tracking server 128, but may instead be implemented within the email server 118.

Populating the Tracking Database 132

Figure 2:
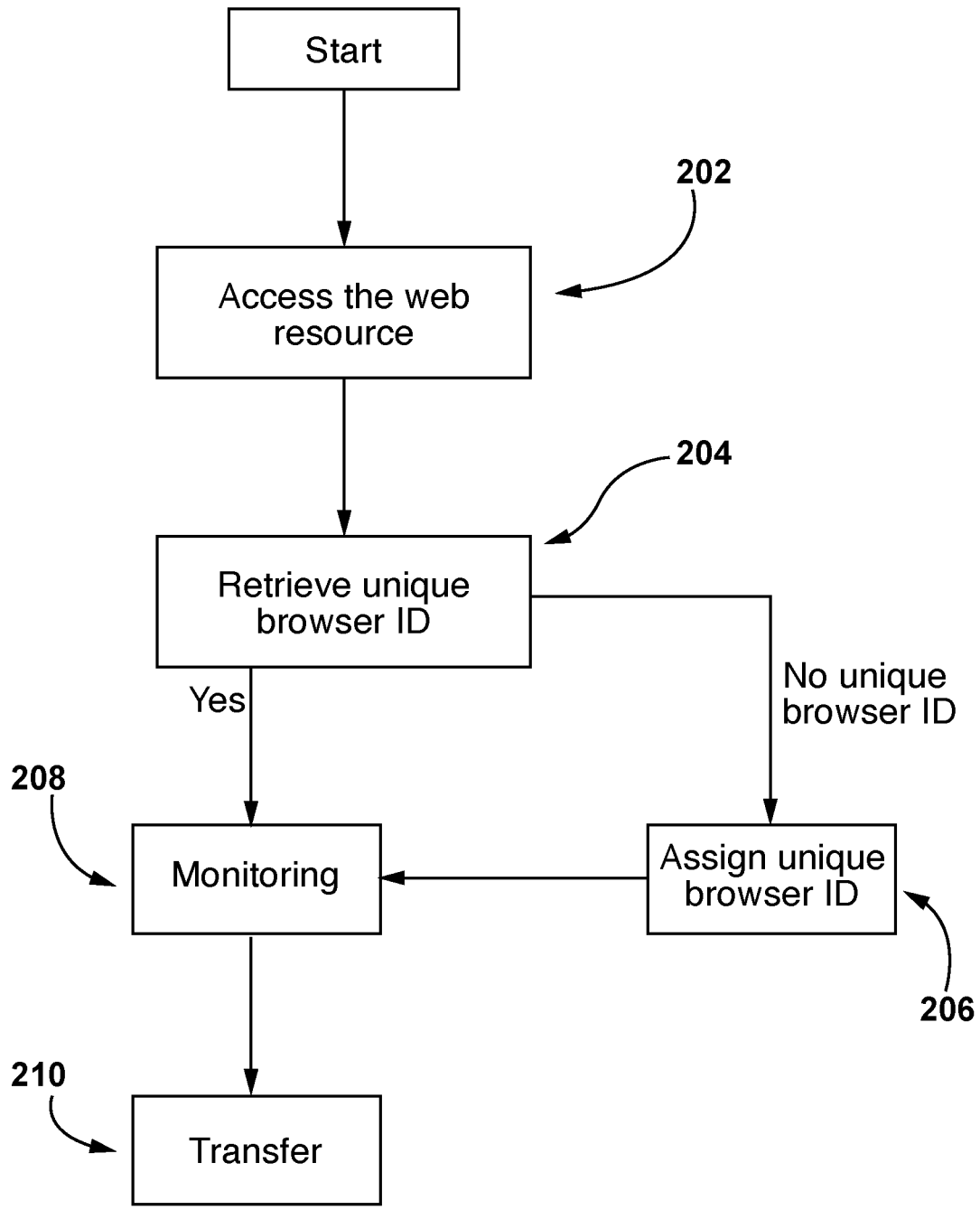
FIG. 2 depicts a flowchart of populating a tracking database of the system 100.

FIG. 2 illustrates a logical flow diagram generally showing a non-limiting embodiment of a process for populating the tracking database 132. Needless to say, the tracking database 132 may be populated according to other techniques, such as those known to those of ordinary skill in the art such as, by way of example only, the techniques described in www.metrica.yandex.com, the entirety of which are incorporated herein by reference.

As an illustration, the manner in which the tracking database 132 is populated will be explained using the first web resource 124. It is to be expressly understood that this is done merely as an example, and it is not intended to be limitative. In other words, same approach can be applied to the second web resource 126.

Starting with a general overview, the first web resource 124 may be serviced by the web analytic application 130 by inserting, by the provider of the first web resource 124 (not depicted), a counter code provided by the web analytic application 130 within the web resource contents. Generally speaking, the counter code consists of a JavaScript snippet code placed in the script element of the first web resource 124. However, the counter code can be based on any other code and/or programming language. In response, the web server 122 receives a source code 144 (see FIG. 1) to be stored therein by the web analytic application 130. As it will be explained in more detail below, the source code 144 executes instructions associated with the web analytic application 130.

Now, starting with step 202, the browser application 108 accesses the first web resource 124 by means described above. Generally speaking, as part of accessing the first web resource 124, the browser application 108 transfers a Hypertext Transfer Protocol (HTTP) request message to the web server 122. For example, where the browser application 108 accesses the first web resource 124 having a URL of www.example.org, the HTTP request message comprises the following request:

GET/index.htmlHTTP/1.1

Host:www.example.org

At step 204, in response to receiving the HTTP request message from the browser application 108, the web server 122 determines whether the browser application 108 has previously been assigned a unique browser ID 134 (depicted in FIG. 1 applicable for those cases where the unique browser ID 134 has been assigned).

Within the context of the present technology, the term "unique browser ID" refers to a proprietary cookie of the web analytic application 130 stored within the permanent storage 104 of the electronic device 102 (as shown in FIG. 1). Unlike HTTP cookies, the unique browser ID 134 does not have an expiration time and is not deleted when the session is expired. As it will be explained in further detail herein below, the unique browser ID 134 allows the web analytic application 130 to determine whether two distinct accesses to the first web resource 124 belong to the same browser application 108.

If it is determined that the browser application 108 does not have a unique browser ID, the process moves to step 206 where a unique browser ID is assigned to the browser application 108 by the source code 144. More precisely, the source code 144 is configured to create and assign the unique browser ID based on a hash function that ensures that the unique browser IDs created and assigned are unique. Continuing with the above example, the web server 122 sends to the browser application 108 the following instructions to store the unique browser ID 134 within the permanent storage 104 of the electronic device 102 (the unique browser ID 134 is referred to as "yandexuid"):

HTTP/1.0 200 OK

Content-type:text/html

Set-Cookie:ExampleORGcookie=<value>

Set-Cookie:yandexuid=<value>

Alternatively, if it is determined that the browser application 108 has already been assigned the unique browser ID 134, the process proceeds to step 208 where a browsing session of the first web resource 124 by the browser application 108 is initiated, and as a result, the counter code is executed. Generally speaking, when the counter code is executed, the source code 144 is configured to gather information about the browsing session, such as the HTML page title, the URL of the first web resource 124, the time of the browsing session, and so on. In some embodiments, the source code 144 monitors events that occur while the user (not depicted) of the browser application 108 interacts with the first web resource 124. This includes the user behavior, such as for examples, filing in and submitting forms, clicking links, scrolling, and the like.

Once the browsing session of the first web resource 124 by the browser application 108 is terminated, the process proceeds to step 210, where the source code 144 causes the web server 122 to transmit the following information to the web analytic application 130:

- an indication of the unique browser ID 134;
- the URL of the accessed web resource (such as the first web resource 124);
- the access time of the accessed web resource by the browser application 108, and
- the monitored user behavior.

The web analytic application 130 is configured to reorganize the received information to generate a browsing history data 302. Broadly speaking, the browsing history data is a logically organized set of information received from the web server 122 (as further explained with reference to FIG. 3 below).

With reference to FIG. 3, there is provided a non-limiting example of the browsing history data 302 of the browser application 108 in the form of an index stored within the tracking database 132. The browsing history data 302 consists of the (i) access time 306 for each of the at least one web resource serviced by the web analytic application 130, and (ii) a set of URLs 304 for each of the at least one web resource, sorted chronologically based on the respective access time 306. Although the browsing history data 302 is depicted as only comprising the access time 306 and the set of URLs 304, it is not limited as such, and may further include other information received by the web analytic application 130 from the web server 122, such as the monitored user behavior associated with the browser application 108.

As illustrated, it is shown that the browser application 108 (which is associated with the unique browser ID 134) has accessed at least 14 web resources that are serviced by the web analytic application 130, before accessing a URL associated with the email service (www.mail.yandex.ru).

Generating an Email Account

Attention is now turned back to FIG. 1. As stated previously, the email server 118 provides the email service (not depicted) that is accessible by the browser application 108. Generally speaking, in order for the user (not depicted) of the browser application 108 to access the email service, the user must register an email account by submitting an account creation request, in the form of a data packet 140 (described below).

The data packet 140 is received by an account registration application 142 stored within the email server 118. The data packet 140 comprises user inputted information, such as some or all of: the user's name, address, date of birth, gender, affiliation, referral, a user name, a password and the like. In some embodiment, the data packet 140 further comprises the unique browser ID 134. Alternatively, the account registration application 142 may request the unique browser ID 134 in response to receiving the data packet 140. Naturally, the data packet 140 may contain other types of data, without departing the scope of the present technology.

The account registration application 142 is stored within the email server memory 120 and comprises computer-executable program instructions executable by the email server processor 146 to detect and prevent spam account registration. More precisely, the account registration application 142 is configured to determine whether the browser application 108 meets at least one first condition determined by an operator (not depicted) of the email server 118. In some embodiments of the present technology, determining whether the browser application 108 meets the at least one first condition comprises determining a user score of the request.

In the context of the present technology, the term "user score" is defined as a score indicative of a likelihood that the user of the browser application 108 is one of a human or a bot executed by a computer application (such as a spambot).

Determining the User Score

Developers have developed embodiments of the present technology based on their appreciation that the prior art methods of using the information contained within the registration request do not provide sufficient data to classify a requestor (i.e. the user originating the account registration request) to be a human or a bot. In developing the present technology, Developers noted that by analyzing the browsing history data 302 of the browser application 108 during registration, a better insight for classifying the requestor to be a bot is obtained.

Figure 4:
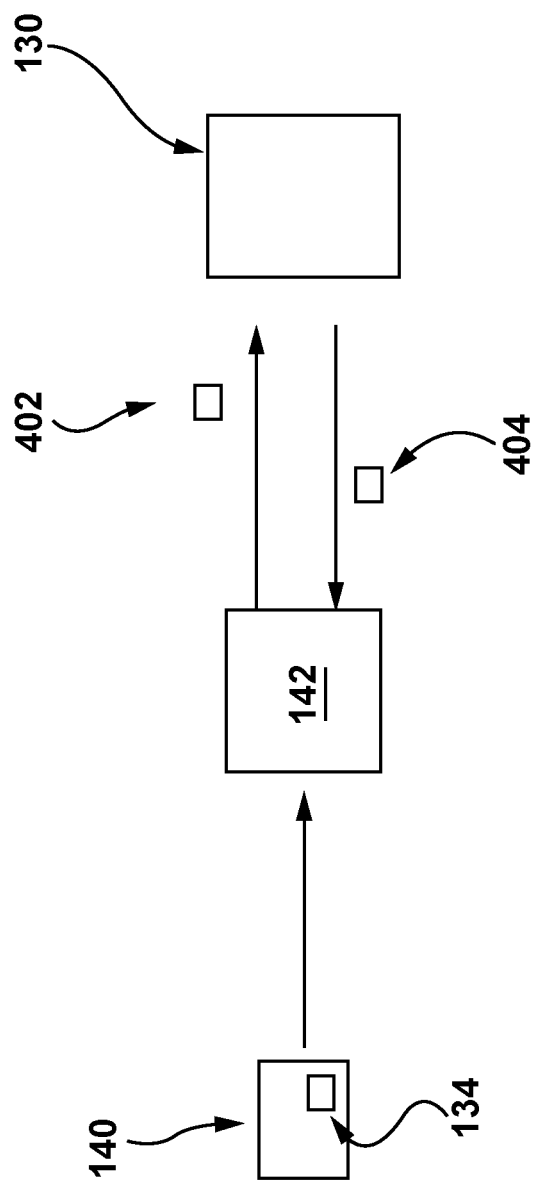
FIG. 4 depicts an example of a process of retrieving the browsing history data stored within the tracking database by the account registration application of the system 100.

Reference is now made to FIG. 4, which illustrates a non-limiting embodiment of a process for determining the user score.

Firstly, the data packet 140, comprising the unique browser ID 134, sent from the browser application 108 is received by the account registration application 142. Once the unique browser ID 134 is received, the account registration application 142 is configured to transmit a data packet 402 to the web analytic application 130 via the communication network 114. In some embodiments, the data packet 402 comprises a request for the browsing history data 302 that is associated with the unique browser ID 134, and as such includes an indication of the unique browser ID 134.

Upon receiving the data packet 402, the web analytic application 130 acquires the indication of the unique browser ID 134 and retrieves the browsing history data 302 associated with the unique browser ID 134 from the tracking database 132. The web analytic application 130 then transmits a data packet 404 which comprises the browsing history data 302 associated with the unique browser ID 134 (see FIG. 3).

The account registration application 142 is configured to, upon receiving the browsing history data 302, parse the URLs forming the set of URLs 304, into one or more navigational sessions. In some embodiments, the account registration application 142 is configured to exclude the last URL of the set of URLs 304 which is associated with the email service (assuming that the email service is serviced by the web analytic application 130). In the context of the present technology, the term "navigational session" refers to a period of time starting with a connection to the communication network 114 by the browser application 108, for the purpose of navigating the Internet, and terminating with a disconnection from the communication network 114. The manner in which the parsing of the set of URLs is done is not limited, and may be done by any manner, such as by grouping URLs having a similar access time 306.

Referring to FIG. 5, there is depicted a set of navigational sessions (first navigational session 502, a second navigational session 512, a third navigational session 514, a fourth navigational session 516, and a fifth navigational session 518). The first navigational session 502 comprises a subset of URLs of the set of URLs 304 determined to belong to the same navigational session as a result of the parsing. As such, the first navigational session 502 includes a first URL 504, a second URL 506, a third URL 508 and a fourth URL 510.

Taking the first navigational session 502 as an example, the account registration application 142 is configured to first retrieve a set of features of the first navigational session 502. In some embodiments of the present technology, the set of features may include at least one of, but is not limited to, the following:
- a duration of the navigational session;
- a number of recurrence of URLs having a same host name in the navigational session;
- a presence of a URL associated with a search engine service in the navigational session; and
- a number of URLs contained within the navigational session.

Each of the above mentioned features will now be explained in detail.

(i) Duration of the First Navigational Session 502

Taking the first navigational session 502 as an example, the account registration application 142 can determine that the requestor spent an approximate time of 7 min of navigating between the first URL 504 and the fourth URL 510.

(ii) Number of Recurrence of URLs having a Same Host Name in the Navigational Session Taking the first navigational session 502 as an example, let us assume that the URLs are the following:

TABLE 1

| | |
|---|---|
| First URL 504 | www.yandex.com |
| Second URL 506 | www.cnn.com |
| Third URL 508 | www.cnn.com/us |
| Fourth URL 510 | www.cnn.com/us/recent_news |

The account registration application 142 is configured to determine that the host name (i.e. the first level domain) of the second URL 506, the third URL 508, and the fourth URL 510 are the same. In some embodiments, the account registration application 142 is further configured to determine that the requestor performed a "linear" navigation by determining that a sequence of transitions between URLs is hierarchical (such as the sequence of the second URL 506 to the fourth URL 510). This determination can be executed by a semantic analysis of the URLs, by applying heuristics or by employing a Machine Learning Algorithm (MLA) having been trained to analysis URL transitions.

(iii) Presence of a URL Associated with a Search Engine Service in the Navigational Session.

Continuing with the Table 1 example, the account registration application 142 is configured to determine that the first URL 504 is directed to a search engine service (i.e. Yandex™).

(iv) Number of URLs Contained within the Navigational Session

Continuing with the first navigational session 502 as an example, the account registration application 142 is configured to determine that there are four URLs contained therein.

It is to be expressly understood that the set of features provided hereinabove are not limitative, and as a person skilled in the art would understand, other types of feature or modifications are contemplated.

In some embodiments, the account registration application 142 comprises a prediction routine (not depicted) to which the aforementioned set of features is transmitted to. In the context of the present technology, the term "routine" is meant to include a subset of the computer readable codes of the account registration application 142 that is executable by the email server processor 146 to perform functions explained below. In some embodiments of the present technology, the prediction routine is a first machine learning algorithm that is configured to determine if a given navigational session is indicative of a high likelihood that the user is a human or bot, as a function of the aforementioned set of features.

More precisely, the prediction routine is configured to assign, for each of the one or more navigational sessions, either one of (i) a logical pattern score value, which represents a low likelihood of the requestor being a bot; and (ii) a non logical pattern score value representing a high likelihood of the requestor being a bot. In some embodiments, the logical pattern score value and the non logical pattern score value may be expressed as a binary value, where the logical pattern score value is 0 and the non logical pattern score value is 1. Needless to say, both the logical pattern score value and the no logical pattern score value may be expressed in a number of different formats.

The manner in which the prediction routine is trained is not limited, and may be based on an empirical (by gathering actual sample marked as human like navigation pattern of the web) or heuristic approach (by defining what a human based navigation of the web would be).

Just as an example, the prediction routine may be trained (based on training data) to attribute a higher likelihood that the user is a bot if it is determined that the duration of the navigational session is excessively long (such as 6 hours, for example) compared to the average human user (such as 30 minutes, for example).

In another example, the prediction routine may be trained (based on the training data) to attribute a higher likelihood that the user is a bot if it is determined that there is scarce recurrence of the host name, and/or if the sequence of URLs is consistently or predominantly non-linear.

In a further example, the prediction routine may be trained (based on the training data) to attribute a higher likelihood that the user is a bot if it is determined that there is no URL associated with a search engine service contained within the given navigation session. As such, the prediction routine may have access to a list of URLs associated with one or more search engine services (such as Google™, Yandex™, and the like). This analysis is based on the appreciation of the developers that human users tend to use search engines during navigation on the Internet.

In yet another example, the prediction routine may be trained (based on the training data) to attribute a higher likelihood that the user is a bot if it is determined that the number of URLs contained within the given navigation session is excessively long (such as 100 URLs, for example), compared to the average human user (such as 10 URLs, for example).

In yet another example, the prediction routine may be trained (based on the training data) to attribute a higher likelihood that the user is a bot if it is determined that the browser application 108 has accessed an excessive number of URLs within a predetermined time (such as 1000 URLs per minute, for example), compared to the average human user (such as 4 URLs per minute for example).

Needless to say, these above examples are provided for illustrative purposes and are not intended to be limited.

Taking the first navigational session 502, the prediction routine may be configured to determine that that the navigational pattern corresponds to a higher probability that the requestor is human. As such, the account registration application 142 is configured to assign the logical pattern score value (i.e. 0) to the first navigational session 502.

In some embodiments, the prediction routine is configured to assign one of the logical pattern score value or non-logical pattern score value to each navigational sessions included in the browsing history data 302. Once each of the navigational sessions has been analyzed, the account registration application 142 aggregates the logical pattern score values and/or non-logical pattern score values, and is further divided by a total number of navigational sessions included in the browsing history data 302 to obtain the user score.

For example, it may be determined that all of the navigational sessions, except the fourth navigational session 516, are assigned the logical pattern score value (i.e. a value of zero). As such, the user score is 0.2, or 20% (since out of the five navigational sessions, only the fourth navigational session 516 has been assigned the non logical pattern score value of 1).

Needles to say, it is contemplated that other means for obtaining the user score is contemplated. For example, the prediction routine may be configured to assign the user score based on the total number of navigational sessions having been assigned a non-logical pattern score value (such as, a user score of 30% for each navigational sessions having been assigned a non-logical pattern score value). As such, if it is determined that there is two navigational sessions that have been assigned a non-logical pattern score value, the corresponding user score (irrespective of the total number of navigational sessions) is determined to be 60%.

In some embodiments, the account registration application 142 is configured to determine if the obtained user score is indicative of a higher likelihood that the requestor is a bot. The manner in which the determination is made is not limited, and may be done by determining if the user score is above a confidence threshold that is indicative of a confidence that the requestor is the bot.

The manner in which the confidence threshold is determined is not limited, and, as such, the confidence threshold may be empirically determined. For example, it may have been previously empirically determined that if more than 80% of the navigational sessions have been assigned a non logical pattern score value, the requestor has the higher likelihood that the user is a bot. Needless to say, other possible approaches are possible and the method provided above is not limitative.

Taking the browsing history data 302 as an example, since the user score is 20%, the account registration application 142 deems the requestor not to be a bot. As a result, an account registration process may proceed.

On the other hand, if the user score of the browsing history data 302 was above the confidence threshold, the account registration application 142 may be configured to perform a restrictive action. In the context of the present technology, the term "restrictive action" may refer to at least one of: (i) refusing the request to create the email account; (ii) performing a challenge-response authentication that the requestor is human (such as CAPTCHA); and (iii) creating the email account with one or more restrictions, such as, but not limited to (a) limiting access time to the account; (b) limiting the use of the account, such as the number of outgoing email messages; (c) assigning a low reputation score to the account, and the like.

Needless to say, it is also contemplated to implement more than one confidence threshold and performing a different restrictive action for each confidence threshold. For example, it is contemplated that if the user score is above a first confidence threshold (such as 80%), the email account creation request is denied, whereas if the user score is below the first confidence threshold but above a second confidence threshold (such as 60%), the email account creation request is subject to a successful completion of the challenge-response authentication.

In a further embodiment, if it is determined that the user score is below the confidence threshold (i.e. the requestor is determined to be human), the account registration application 142 is further configured to determine whether the browser application 108 meets at least one second condition determined by the operator (not depicted) of the email server 118. In some embodiments of the present technology, determining whether the browser application 108 meets the at least one second condition comprises determining a potential human spammer score value (described below).

Determining the Potential Spammer Score Value

Developers have developed some embodiments of the present technology based on their appreciation that spamming does not originate only from bots. Therefore, even if the account registration application 142 can restrict the creation of email accounts originated from bots by implementing the above described technology, additional filtering of e-mail creation requests may be desirable.

In other words, it is possible that even if the requestor is determined to be a human, there is still a risk that the requestor will engage in spamming activities once the account has been created. In developing the present technology, developers noted that by analyzing the browsing history data 302 of the browser application 108 during registration, it is also possible to predict the likelihood that the human requestor may engage in spamming activities.

In the context of the present technology, the term "potential human spammer score value" refers to an indication of a likelihood that the requestor is a potential spammer or not. The potential human spammer score value may be expressed in a number of different formats. For example, it may be expressed in a percentage, with one hundred being the highest likelihood (i.e. confidence) that the human requestor will engage in spamming activities.

In some embodiments of the present technology, the method of determining the potential spammer score value comprises a combination, or at least one of: (i) determining if the browser application 108 has accessed one or more blacklisted web resources (described below), and (ii) determining if the browser application's 108 has been used by an undetermined number of human users. These above mentioned methods will now be explained in detail.

Accessing Blacklisted Web Resources

Briefly referring back to FIG. 1, in some embodiments of the present technology, in order to determine the potential spammer score value, the email server 118 is configured to maintain an index 136 which contains an indication of identified blacklisted web resources (not depicted). In the context of the present technology, the term "blacklisted web resources" refers to a list of web resources empirically determined by the operator (not depicted) of the email server 118, which are associated with spamming activities. An example of a web resource that could be within the list may be, for example, a web resource directed at hiring spam senders, a how-to guide on sending spam messages, and a how-to guide on cheating antispam filters and the like.

Referring back to FIG. 4, the account registration application 142 is configured to, upon receiving the data packet 404, access the index 136 and determine the potential spammer score value. The manner in which the potential spammer score value is determined is not limited, and may be determined based on a ratio of URLs comprising the browsing history data 302 found within the index 136, to a total number of URLs included in the set of URLs 304. For example, for each ratio there is provided a value of the potential spammer score value that has been previously determined by a second machine learning algorithm trained with samples marked as human spammers. An illustrative example of the ratios and the corresponding potential spammer score value is illustrated in Table 2 below. These potential spammer score values are for illustrative purpose only and are no way intended to be limitative.

TABLE 2

| Percentage of URLs of the set of URLs 304 contained within the index 136 | Potential spammer score value |
|---|---|
| >90% | 0.9 |
| >80% | 0.8 |
| ... | ... |
| >50% | 0.5 |
| ... | ... |
| 0% | 0.0 |

In some embodiments, the potential human spammer score value so obtained is compared against a first spammer confidence threshold that is indicative of a confidence that the human requestor is a potential spammer. The manner in which the first spammer confidence threshold is determined is not limited, and may empirically be determined. If it is determined that the potential human spammer score value is indicative of a higher likelihood that the requestor is a potential spammer (i.e. above the first spammer confidence threshold), the account registration application 142 is configured to perform one of the restrictive action described above.

Undetermined Number of Users

The present embodiment of the technology is based on developer's appreciation that a request to open an email account from a browser application that has a high volume content browsing history may have a higher likelihood to be associated with potential spamming activities, since it is generally indicative that the browser application is used by an undetermined large number of people (such as those offered in an internet cafe). Conversely, it may also be said that a request to open an email account from a browser application that lacks browsing history is also more likely to be associated with potential spamming activities.

As such, the account registration application 142 is configured to, based on the number of URLs contained within the set of URLs 304, determine the potential human spammer score value. For example, the account registration application 142 is configured to count the number of URLs contained within the set of URLs 304 and assign probability values that have been previously determined by a third machine learning algorithm trained with samples marked as human spammers. An illustrative example of the number of URLs contained within the set of URLs 304 and the corresponding potential spammer score value is illustrated in Table 3 below. These potential spammer score values are for illustrative purpose only and are no way intended to be limitative.

TABLE 3

| Number of accessed URLs | Potential spammer score value |
|---|---|
| 0 < 10 | 0.9 |
| 9 < 30 | 0.3 |
| 29< | 0.9 |

In some embodiments, the potential human spammer score value so obtained is compared against a second spammer confidence threshold that is indicative of a confidence that the human requestor is a potential spammer. The manner in which the second spammer confidence threshold is determined is not limited, and may be empirically be determined. If it is determined that the potential human spammer score value is indicative of a higher likelihood that the requestor is a potential spammer (i.e. above the second spammer confidence threshold), the account registration application 142 is configured to perform one of the restrictive action described above.

Although the present technology has been described as "cascading" from determining the user score and then determining the potential human spammer score value (if the user score is below the confidence threshold), it is not limited as such. It is contemplated that the determining of the user score be performed simultaneously with the determining of the potential human spammer score.

Figure 6:
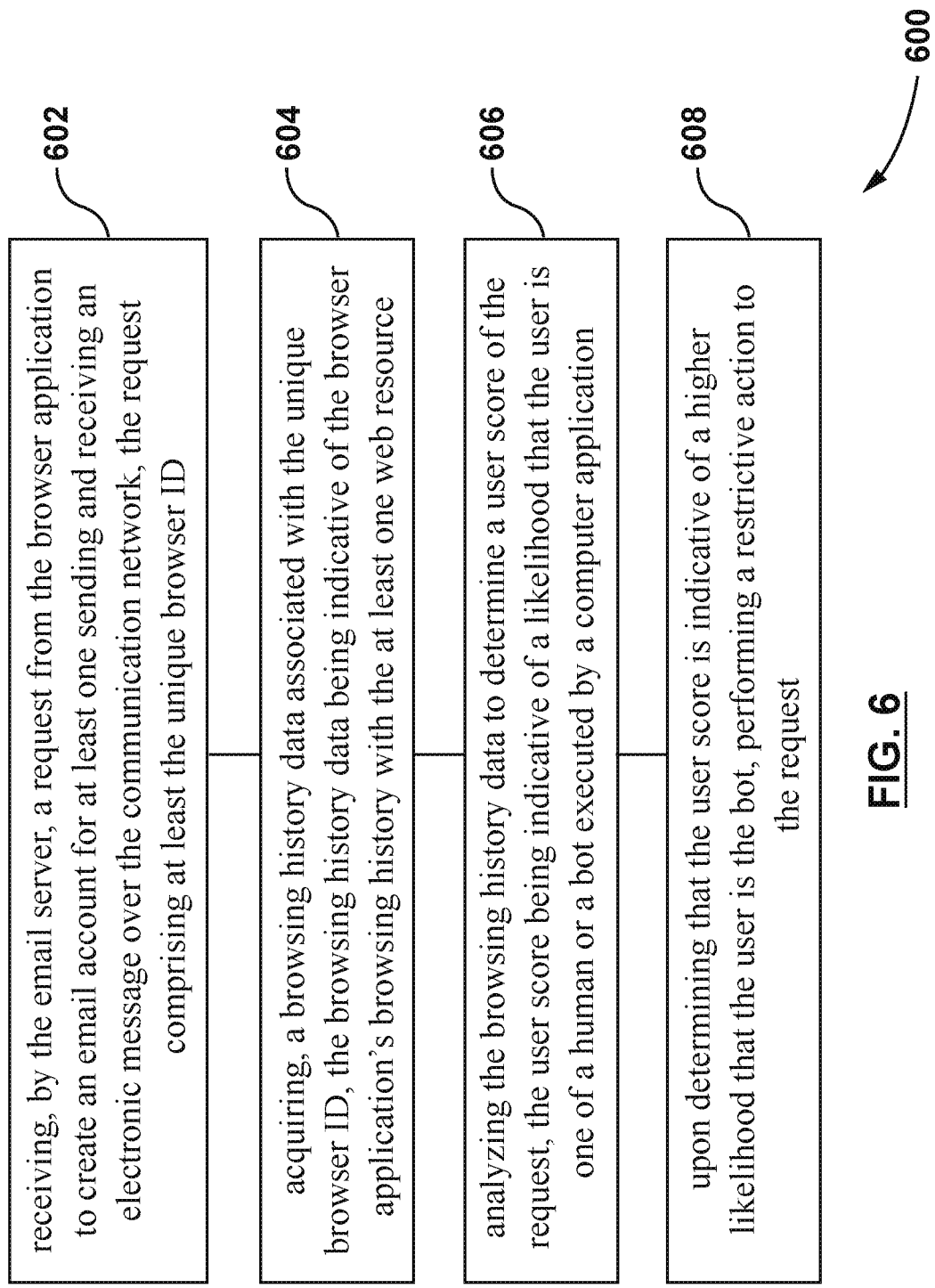
FIG. 6 depicts a flow chart of a method for detecting and preventing spam account registration being executable by the email server of the system 100, the method being executed in accordance with non-limiting embodiments of the present technology.

Given the architecture and examples provided herein above, it is possible to execute a computer-implemented method of detecting and preventing spam account registration. With reference to FIG. 6, there is depicted a flow chart of a method 600, the method 600 being executable in accordance with non-limiting embodiments of the present technology. The method 600 can be executed by the email server 118.

Step 602—receiving, by the email server, a request from the browser application to create an email account for at least one of sending and receiving an electronic message over the communication network, the request comprising at least the unique browser ID.

The method 600 starts at step 602, where the account registration request in the form of the data packet 140 is received by an account registration application 142 stored within the email server 118.

The data packet 140 comprises an indication of the unique browser ID 134.

Step 604: acquiring, a browsing history data associated with the unique browser ID, the browsing history data being indicative of the browser application's browsing history with the at least one web resource.

At step 604, the account registration application 142 is configured to transmit the data packet 402 to the web analytic application 130. The data packet 402 comprises the request for browsing history data 302 that is associated with the unique browser ID 134.

In some embodiments, the web analytic application 130 is hosted by the email server 118.

In response, the web analytic application 130 transmits the data packet 404 which is received by the account registration application 142. The data packet 404 comprises the browsing history data 302 associated with the unique browser ID 134.

Step 606: analyzing the browsing history data to determine a user score of the request, the user score being indicative of a likelihood that the user is one of a human or a bot executed by a computer application.

At step 606, the account registration application 142 is configured to determine the user score associated with the browser application 108.

The user score is determined by parsing the chronologically sorted one or more URLs contained within the set of URLs 304 into one or more navigational sessions. Each of the one or more navigational sessions is then analyzed to then be assigned either one of the logical pattern score value or the non-logical pattern score value. Finally, the logical pattern score value and the non-logical pattern score value of the one or more navigational sessions are aggregated and then divided by the total number of navigational sessions included in the browsing history data 302 to obtain the user score.

Step 608: upon determining that the user score is indicative of a higher likelihood that the user is the bot, performing a restrictive action to the request.

At step 608, the account registration application 142 is configured to determine whether the user score is above the confidence threshold. In the affirmative, the account registration application 142 considers that the user score is indicative of a higher likelihood that the user is the bot, and is configured to perform one of the above mentioned restrictive actions.

It should be apparent to those skilled in the art that at least some embodiments of the present technology aim to expand a range of technical solutions for addressing a particular technical problem, namely decreasing the computational burden imposed on email servers by decreasing the number of spam messages that are sent over the communication network, which is believed to improve network traffic and reduce the burden on network servers. It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is indented to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer implemented method, the method being executable on an email server coupled to a client device associated with a user, via a communication network, the client device comprising:
   a permanent storage;
   a browser application having previously accessed, via the communication network, at least one web resource; and
   a unique browser ID associated with the browser application and stored within the permanent storage; and the email server being further coupled to a tracking server via the communication network, the tracking server configured to:
   store browsing history data indicative of the browsing history of the browser application, the browser history including an indication of the at least one web resource; and
   associate the stored browsing history data with the unique browser ID;
   execute a machine learning algorithm (MLA), the MLA having been previously trained on a sample that is marked as human like navigational pattern, and configured to determine if a set of predetermined features of a given navigational session is indicative of one of a low likelihood of the user being a bot, or a high likelihood of the user being a bot;

the method comprising:
   receiving, by the email server, a request from the browser application to create an email account for at least one of sending and receiving an electronic message over the communication network, the request comprising at least the unique browser ID;
   acquiring, from the tracking server, the browsing history data associated with the unique browser ID, the acquiring the browsing history data comprising retrieving the browsing history data from the tracking server executing a web analytic application servicing the at least one web resource, the browsing history data comprising:
      an access time for each of the at least one web resource by the browser application; and
      one or more uniform resource locators (URLs) sorted chronologically based on its respective access time, each of the one or more URLs corresponding to a respective one of the at least one web resource;
   analyzing the browsing history data to determine a user score of the request, the user score being indicative of a likelihood that the user is one of a human or a bot executed by a computer application, determining the user score comprising:
   parsing the chronologically sorted one or more URLs into one or more navigational sessions, the one or more navigational sessions comprising at least one of the one or more URLs accessed by the browser application during a period of time starting with a connection to the communication network by the browser application and terminating with a disconnection from the communication network by the browser application;
   retrieving the set of predetermined features for each of the one or more navigational sessions, the set of predetermined features comprising at least one of:
      a duration of a given navigational session;
      a number of recurrence of URLs having a same host name in the given navigational session;
      a presence of a URL associated with a search engine service in the given navigational session;
      a number of URLs contained within the given navigational session; and
   assigning, for each of the one or more navigational sessions, one of (i) a logical pattern score value representing the low likelihood of the user being a bot, or (ii) a non-logical pattern score value representing the high likelihood of the user being the bot, wherein the assigning the logical pattern score value comprises:
   inputting the retrieved set of features to the MLA;
   assigning the logical pattern score value upon determining that the retrieved set of features is indicative of the low likelihood of the user being a bot;
the assigning the non-logical pattern score value comprises:
   inputting the retrieved set of features to the MLA;
   assigning the non-logical pattern score value upon determining that the retrieved set of features is indicative of the high likelihood of the user being a bot;
obtaining the user score by aggregating the logical pattern score value and the non-logical pattern score value of the one or more navigational sessions and further dividing by a total number of navigational sessions included in the browsing history data;
upon determining that the user score is indicative of a higher likelihood that the user is the bot, performing a restrictive action to the request.

2. The method of claim 1, wherein determining that the user score is indicative of a higher likelihood that the user is the bot comprises determining the obtained user score to be above an empirically determined confidence threshold indicative of a confidence that the user is the bot.

3. The method of claim 2, wherein upon determining that the user score is below the confidence threshold, the method further comprises:
   determining a potential human spammer score value, the potential human spammer score value being indicative of a likelihood that the user is a potential spammer or not; and
   performing the restrictive action to the request upon determining that the potential human spammer score value is indicative of a higher likelihood that the user is a potential spammer.

4. The method of claim 3, wherein:
determining the potential human spammer score value comprises:
   determining a ratio of (i) URLs in the browsing history data found within a list of URLs of one or more web resources empirically determined to be associated with spamming activities, to (ii) a total number of URLs in the web browsing history data; and wherein
   assigning the potential human spammer score value based on the ratio, wherein a higher ratio is indicative of the higher likelihood that the user is a potential spammer.

5. The method of claim 3, wherein determining the potential human spammer score value comprises:
   determining a number of URLs contained within the browsing history data; and
   assigning the potential human spammer score based on the number of URLs contained within the browsing history data, wherein:
      a higher number of URLs above a first predetermined number is indicative of the higher likelihood that the user is a potential spammer; and
      a lower number of URLs below a second predetermined number is indicative of the higher likelihood that the user is a potential spammer.

6. The method of claim 4, wherein the list of URLs is maintained by the email server.

7. The method of claim 1, wherein the restrictive action comprises refusing the request to create the email account.

8. An email server coupled to a client device associated with a user via a communication network, the client device comprising a permanent storage, a browser application having previously accessed, via the communication network, at least one web resource, and a unique browser ID associated with the browser application stored within the permanent storage, the email server being further coupled to a tracking server via the communication network, the tracking server configured to:
   store browsing history data indicative of the browsing history of the browsing application, the browser history including an indication of the at least one web resource and
   associate the stored browsing history data with the unique browser ID,
   execute a machine learning algorithm (MLA), the MLA having been previously trained on a sample that is marked as human like navigational pattern, and configured to determine if a set of predetermined features of a given navigational session is indicative of one of a low likelihood of the user being a bot, or a high likelihood of the user being a bot; and
the email server comprising:
a network interface for communicatively coupling to the communication network;
a processor coupled to the network interface, the processor configured to:
   receive, by the email server, a request from the browser application to create an email account for at least one of sending and receiving an electronic message over the communication network, the request comprising at least the unique browser ID;
   acquire, from the tracking server, the browsing history data associated with the unique browser ID, to acquire the browsing history data, the processor being configured to retrieve the browsing history data from the tracking server executing a web analytic application servicing the at least one web resource, the browsing history data comprising:
      an access time for each of the at least one web resource by the browser application; and
      one or more uniform resource locators (URLs) sorted chronologically based on its respective access time, each of the one or more URLs corresponding to a respective one of the at least one web resource;
   analyze the browsing history data to determine a user score of the request, the user score being indicative of a likelihood that the user is one of a human or a bot executed by a computer application,
   to determine the user score, the processor being configured to:
      parse the chronologically sorted one or more URLs into one or more navigational sessions, the one or more navigational sessions comprising at least one of the one or more URLs accessed by the browser application during a period of time starting with a connection to the communication network by the browser application and terminating with a disconnection from the communication network by the browser application;
      retrieve the set of predetermined features for each of the one or more navigational sessions, the set of predetermined features comprising at least one of:
         a duration of a given navigational session;
         a number of recurrence of URLs having a same host name in the given navigational session;

a presence of a URL associated with a search engine service in the given navigational session;

a number of URLs contained within the given navigational session; and assign, for each of the one or more navigational sessions, one of (i) a logical pattern score value representing the low likelihood of the user being a bot, or (ii) a non-logical pattern score value representing the high likelihood of the user being a bot, wherein to assign the logical pattern score value, the processor is configured to:

input the retrieved set of features to the MLA;

assign the logical pattern score value upon determining that the retrieved set of features is indicative of the low likelihood of the user being the bot;

to assign the non-logical pattern score value, the processor is configured to:

input the retrieved set of features to the MLA;

assign the non-logical pattern score value upon determining that the retrieved set of features is indicative of the high likelihood of the user being the bot;

obtain the user score by aggregating the logical pattern score value and the non-logical pattern score value of the one or more navigational sessions and further dividing by a total number of navigational sessions included in the browsing history data;

upon determining that the user score is indicative of a higher likelihood that the user is the bot, perform a restrictive action to the request.

9. The email server of claim 8, wherein to determine that the user score is indicative of a higher likelihood that the user is the bot, the processor is configured to determine the obtained user score to be above an empirically determined confidence threshold indicative of a confidence that the user is the bot.

10. The email server of claim 9, wherein upon determining that the user score is below the confidence threshold, the processor is further configured to:

determine a potential human spammer score value, the potential human spammer score value being indicative of a likelihood that the user is a potential spammer or not; and perform the restrictive action to the request upon determining that the potential human spammer score value is indicative of a higher likelihood that the user is a potential spammer.

11. The email server of claim 10, wherein:

to determine the potential human spammer score value, the processor is configured to:

determine a ratio of (i) URLs in the browsing history data found within a list of URLs of one or more web resources empirically determined to be associated with spamming activities, to (ii) a total number of URLs in the web browsing history data; and assign the potential human spammer score value based on the ratio, wherein a higher ratio is indicative of the higher likelihood that the user is a potential spammer.

12. The email server of claim 10, wherein to determine the potential human spammer score value, the processor is configured to:

determine a number of URLs contained within the browsing history data; and assign the potential human spammer score based on the number of URLs contained within the browsing history data, wherein:

a higher number of URLs above a first predetermined number is indicative of the higher likelihood that the user is a potential spammer; and a lower number of URLs below a second predetermined number is indicative of the higher likelihood that the user is a potential spammer.

* * * * *